United States Patent
Fischer

(10) Patent No.: US 7,241,431 B2
(45) Date of Patent: Jul. 10, 2007

(54) METHOD AND EMISSION CONTROL SYSTEM FOR CATALYTICALLY REDUCING NITROGEN OXIDES IN THE EXHAUST GAS OF A COMBUSTION SYSTEM

(75) Inventor: Stefan Fischer, Lichtenfels (DE)

(73) Assignee: Siemens Aktiengesellschaft, Munich (DE)

( * ) Notice: Subject to any disclaimer, the term of this patent is extended or adjusted under 35 U.S.C. 154(b) by 291 days.

(21) Appl. No.: 10/204,898

(22) PCT Filed: Feb. 28, 2001

(86) PCT No.: PCT/DE01/00738

§ 371 (c)(1),
(2), (4) Date: Aug. 28, 2002

(87) PCT Pub. No.: WO01/64319

PCT Pub. Date: Sep. 7, 2001

(65) Prior Publication Data

US 2003/0014194 A1    Jan. 16, 2003

(30) Foreign Application Priority Data

Feb. 28, 2000   (DE) ................ 100 09 427

(51) Int. Cl.
*B01D 53/56* (2006.01)
(52) U.S. Cl. .................................. 423/239.1
(58) Field of Classification Search ......... 423/235, 423/239.1
See application file for complete search history.

(56) References Cited

U.S. PATENT DOCUMENTS

| | | | |
|---|---|---|---|
| 4,351,811 A | 9/1982 | Matsuda et al. | |
| 5,367,875 A | 11/1994 | Aboujaoude et al. | |
| 5,968,464 A * | 10/1999 | Peter-Hoblyn et al. | 423/235 |
| 6,203,770 B1 * | 3/2001 | Peter-Hoblyn et al. | 423/212 |
| 6,348,178 B1 * | 2/2002 | Sudduth et al. | 423/235 |

FOREIGN PATENT DOCUMENTS

| | | |
|---|---|---|
| DE | 2832002 | 1/1979 |
| WO | 00/29728 | 5/2000 |

OTHER PUBLICATIONS

Martin Aust, Rainer Tost, Gerhard Wissler, Dr. Stefan Fischer and Dr. Jürgen Zürbig; "Exhaust Gas Aftertreatment System To Meet EURO IV Emission Standards For Diesel Passenger Cars"; pp. 269-289.

Dr. Eberhard Jacob, Gerhard Emmerling, Andreas Döring, Ulrich Graf, Michael Harris, Dr. Johan A. A. Van Den Tillaart and Bernd Hupfeld; Reduction of $NO_x$ From HD Diesel Engines With Urea SCR Compact Systems (Controlled Diesel Catalyst); pp. 366-386.

* cited by examiner

*Primary Examiner*—Edward M. Johnson
(74) *Attorney, Agent, or Firm*—Harness, Dickey & Pierce, P.L.C.

(57) ABSTRACT

A method and an emission control system are for catalytically reducing nitrogen oxides in the exhaust gas of a combustion system, especially a diesel motor. An oxidation catalyst is arranged upstream in relation to the reduction catalyst and in the exhaust gas channel. A reaction agent for decomposing nitrogen oxides according to the method of the selective catalytic reduction is added according to the temperature and upstream or downstream in relation to the oxidation catalyst and upstream in relation to the reduction catalyst. The selectivity of the oxidation catalyst is used for decomposing nitrogen oxides to form molecular nitrogen.

16 Claims, 2 Drawing Sheets

METHOD AND EMISSION CONTROL SYSTEM FOR CATALYTICALLY REDUCING NITROGEN OXIDES IN THE EXHAUST GAS OF A COMBUSTION SYSTEM

This application is the national phase under 35 U.S.C. § 371 of PCT International Application No. PCT/DE01/00738 which has an International filing date of Feb. 28, 2001, which designated the United States of America and which claims priority on German Patent Application No. 100 09 427.9 filed Feb. 28, 2000, the entire contents of which are hereby incorporated herein by reference.

FIELD OF THE INVENTION

The invention generally relates to a process for the catalytic reduction of nitrogen oxides in the exhaust gas from a combustion system. In particular, it may relate to one in a diesel engine, in which the exhaust gas first of all flows over an oxidation catalytic converter, which on its surface which is accessible to the exhaust gas comprises platinum (Pt) and if appropriate palladium (Pd) and/or rhodium (Rh), and then flows over a reduction catalytic converter, which on its surface which is accessible to the exhaust gas comprises titanium dioxide ($TiO_2$), tungsten trioxide ($WO_3$), vanadium pentoxide ($V_2O_5$) and if appropriate molybdenum trioxide ($MoO_3$), and in which a reagent is added to the exhaust gas. The invention also generally relates to an exhaust-cleaning system for carrying out the process. Particularly, it may relate to one having an exhaust pipe, having a reduction catalytic converter, an oxidation catalytic converter connected upstream thereof and having the abovementioned composition, and an introduction device for introducing the reagent into the exhaust gas.

BACKGROUND OF THE INVENTION

An exhaust-cleaning system and a process are known from the articles "Abgasnachbe-handlungssystem zur Erfüllung von Euro IV Grenzwerten bei PKW-Dieselmotoren" [Exhaust aftertreatment system for complying with Euro IV limit values in passenger automobile diesel engines] by Aust, Tost, Wißler, Fischer and Zürbig, and $NO_x$-Verminderung für Nutzfahr-zeugmotoren mit Harnstoff-SCR-Kompaktsystemen [Lowering the levels of $NO_x$ for commercial vehicle engines using urea-SCR compact systems] (Gesteuerter Diesel-Katalysator, GD-KAT) by Jacob, Emmerling, Döring, Graf, Harris, van den Tillaart and Hupfeld from VDI Fortschrittsberichte, Vol. 12, No. 348, 1998. In this case, the reagent is admixed with the exhaust gas downstream of the oxidation catalytic converter and upstream of the reduction catalytic converter, as seen in the direction of flow of the exhaust gas. In addition to the function of removing soot particles and unburnt hydrocarbons and carbon monoxide which are present in the exhaust gas by oxidation, the oxidation catalytic converter also has the function of shifting the ratio of the nitrogen oxides NO and $NO_2$ which are present in the exhaust gas toward $NO_2$. Therefore, at the oxidation catalytic converter nitrogen monoxide NO is partially oxidized to form nitrogen dioxide $NO_2$.

The increased nitrogen dioxide content which is present in the exhaust gas after it has flowed through the oxidation catalytic converter accelerates the catalytic reaction at the reduction catalytic converter and thereby leads to higher deNOxing rates. The catalytic reaction at the reduction catalytic converter is what is known as selective catalytic reduction (SCR), according to which nitrogen oxides which are present in the exhaust gas, i.e. both nitrogen monoxide and nitrogen dioxide, are reacted to form nitrogen and water by consuming a reducing agent and in the presence of oxygen. The acceleration of the catalytic reaction at a SCR catalytic converter by increasing the relative $NO_2$ content is known from DE 28 32 002 B2. Ammonia or hydrocarbons are known as reducing agents for selective catalytic reduction. Ammonia itself, aqueous ammonia or substances which release ammonia, such as urea or ammonium carbamate, in solid or liquid form, are known as reagents for introducing ammonia into the exhaust gas.

The upstream connection of an oxidation catalytic converter is advantageous if the temperature of the exhaust gas from time to time is below 250° C. This is because at such a low temperature increasing the nitrogen dioxide content by means of the oxidation catalytic converter has an extremely advantageous effect on the catalytic conversion at the reduction catalytic converter.

However, a drawback is that the rate at which nitrogen dioxide $NO_2$ is formed from nitrogen monoxide NO at the oxidation catalytic converter decreases considerably at temperatures below 200° C., so that at temperatures below 200° C. only insufficient deNOxing can be achieved even with a combination of oxidation catalytic converter and reduction catalytic converter.

SUMMARY OF THE INVENTION

It is an object of an embodiment of the invention to provide a process for the catalytic reduction of nitrogen oxides in the exhaust gas from a combustion system, by which nitrogen oxides which are present in the exhaust gas are broken down more effectively. Preferably, this is done using the selective catalytic reduction process, at low temperatures compared to a known similar process. A further object of an embodiment of the invention may be to provide an exhaust-cleaning system for the catalytic reduction of nitrogen oxides in the exhaust gas from a combustion system which allows the selective catalytic reduction process to be used at lower temperatures than a similar known device.

An object may be achieved, according to an embodiment of the invention, by an exhaust-gas temperature being measured and compared with a set temperature, and/or in the case of an exhaust-gas temperature that is lower than the set temperature, by the reagent being added to the exhaust gas before it flows through the oxidation catalytic converter, and/or in the case of an exhaust-gas temperature which is higher than the set temperature, by the reagent being added to the exhaust gas after it has flowed through the oxidation catalytic converter but before it flows through the reduction catalytic converter. An embodiment of the invention is based on the consideration that the rate at which nitrogen dioxide $NO_2$ is formed from nitrogen monoxide NO at the oxidation catalytic converter connected upstream of the reduction catalytic converter decreases as temperatures fall below approximately 250° C., so that the lower the temperature, the lower the deNOxing rates which are achieved, even with a combination of oxidation catalytic converter and reduction catalytic converter in this lower temperature range.

Furthermore, an embodiment of the invention may be based on the discovery that an oxidation catalytic converter based on platinum, if appropriate with additions of palladium and/or rhodium, in the temperature range of below approximately 250° C. has a catalytic activity for breaking down nitrogen oxides using the selective catalytic reduction process. Below approximately 250° C., the selectivity of the oxidation catalytic converter for the catalytic conversion of nitrogen oxides to molecular nitrogen using the selective catalytic reduction process rises as the temperatures fall. However, it is also stated that the general conversion rate of NO at the oxidation catalytic converter drops within the temperature range as the temperatures fall.

An embodiment of the invention may furthermore be based on the fact that the activity of the oxidation catalytic converter for breaking down nitrogen oxides using the selective catalytic reduction process at the oxidation catalytic converter can be exploited if a suitable reducing agent is already available at that location. For this purpose, a reagent may be added upstream of the oxidation catalytic converter. The term reagent is understood as meaning both the reducing agent itself and all other substances which release the reducing agent.

Since the selectivity of the oxidation catalytic converter is once again low for conversion of the nitrogen oxides into molecular nitrogen at temperatures above 250° C. and, moreover, in this temperature range the downstream reduction catalytic converter once again operates effectively, the exhaust-gas temperature may be measured and compared with a set value. If the set value is below the exhaust-gas temperature, the addition of the reagent may be switched from upstream of the oxidation catalytic converter to downstream of the oxidation catalytic converter and upstream of the reduction catalytic converter.

Stipulating a set temperature allows a temperature-dependent switch of the point at which the reagent is introduced from upstream to downstream of the oxidation catalytic converter in a manner which is adapted to the specific composition of the oxidation catalytic converter. Specifically, the temperature-dependent selectivity of the oxidation catalytic converter for converting nitrogen oxides into molecular nitrogen by use of a reagent which is present in the exhaust gas is dependent on the composition of the oxidation catalytic converter.

In an exhaust-cleaning system with a combination of oxidation catalytic converter and reducing catalytic converter, introducing the reagent in front or upstream of the oxidation catalytic converter allows the residual activity of the oxidation catalytic converter in a temperature range below approximately 250° C. to be utilized to selectively break down nitrogen oxides into molecular nitrogen, so that the nitrogen oxides can be broken down more effectively in this temperature range than with a similar exhaust-cleaning system from the prior art.

The set temperature is advantageously selected from a temperature range between 150° C. and 250° C. Below a set temperature which is selected from this temperature range, for most commercially available precious-metal oxidation catalytic converters based on platinum with a moderate activity, the selectivity with regard to the conversion of nitrogen oxides to nitrogen increases. This is the case, for example, with the oxidation catalytic converter which is available from Engelhard, USA under the name $NO_xCat920LT$. On their surface which is accessible to the exhaust gas, oxidation catalytic converters contain 50–90 g/cf (cubic feet) of platinum, typically 70 g/cf.

In a particularly advantageous configuration of the invention, the set temperature is selected from a temperature range between 190° C. and 210° C. This is particularly advantageous when the process is used for a diesel engine. This is because it has emerged that at an exhaust-gas temperature which is below a set temperature selected from this range, at the space velocities which customarily prevail downstream of a diesel engine, the selectivity of standard precious-metal oxidation catalytic converters for the conversion of nitrogen oxides into molecular nitrogen increases.

The exhaust-gas temperature may be advantageously measured in the exhaust gas before it flows through the oxidation catalytic converter.

It is preferable for an aqueous urea solution or aqueous ammonia to be injected as reagent into the exhaust gas via an injection nozzle. A liquid reagent allows a simpler metering technique than a solid reagent. Moreover, a liquid reagent is easier to handle than a gaseous reagent.

However, the process can, of course, also be carried out using a solid reagent, such as urea, or other substances which release ammonia. It is also conceivable to introduce gaseous ammonia or ammonia which has been released from ammonium carbamate. Compared to other reducing agents, such as for example hydrocarbons, ammonia has proven to be most effective for the use of the selective catalytic reduction process.

According to an embodiment of the invention, the second object, for an exhaust-cleaning system of the type described in the introduction, may be achieved by the fact that the introduction device for introducing the reagent into the exhaust gas comprises a first addition line and a second addition line, the first addition line opening out into the exhaust pipe upstream of the oxidation catalytic converter and the second addition line opening out into the exhaust pipe downstream of the oxidation catalytic converter and upstream of the reduction catalytic converter, and that a temperature sensor is arranged in the exhaust pipe.

The temperature sensor may be advantageously arranged upstream of the oxidation catalytic converter. In this case, the temperature of the exhaust gas is not influenced by catalytic reactions at the catalytic converters.

In a further advantageous configuration of the invention, the introduction device comprises a reagent reservoir, to which the first and second addition lines are directly connected. In this case, the incoming flow of the reagent can be controlled or regulated separately, i.e. independently, in the first and second addition lines. By way of example, in each case one controllable valve may be arranged in the first and second addition lines in order to control or regulate the incoming flow of reagent. Also, if a solid reagent is being used, it is possible for suitably designed, controllable or regulatable metering devices to be arranged at the end or within the addition lines.

In another advantageous configuration of the exhaust-cleaning system, the introduction device comprises a reagent reservoir, to which a feed line, which has a branch leading into the first and into the second addition line, is connected. In this case, the addition of the reagent can be passed either into the first addition line or into the second addition line by use of a simple three-way arrangement at the branching point. Once again, the diversion of the reagent is initiated by using the temperature sensor. In the case of a liquid or gaseous reagent, the branching point can advantageously be designed as a three-way valve.

In the case of a liquid or gaseous reagent, it is advantageous if the first addition line and the second addition line each open out into the exhaust pipe via an injection nozzle. The injection nozzle may be either a two-substance nozzle or a one-substance nozzle. The quantity of reagent added can be introduced in a finely distributed form and targeted in one direction with the aid of an injection nozzle.

BRIEF DESCRIPTION OF THE DRAWINGS

Exemplary embodiments of the invention are explained in more detail with reference to the drawings, in which.

DETAILED DESCRIPTION OF THE PREFERRED EMBODIMENTS

Figure 1:
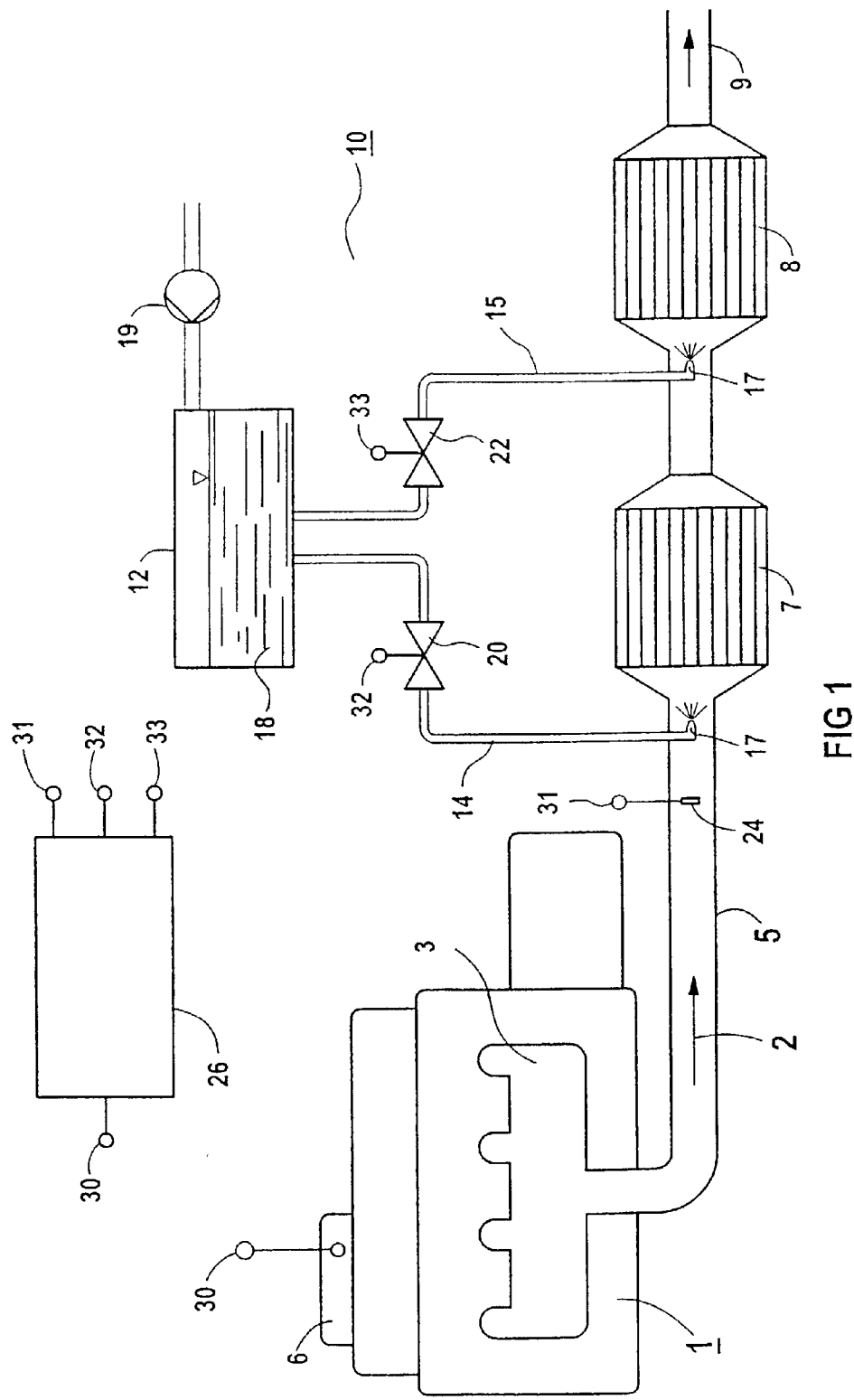
FIG. 1 diagrammatically depicts an exhaust-cleaning system having a first and a second addition line which are directly connected to a reagent reservoir, and FIG. 2 diagrammatically depicts an exhaust-cleaning system having a branching point into a first addition line and a second addition line, which is arranged in a feed line connected to a reducing-agent reservoir.

FIG. 1 diagrammatically depicts an exhaust-cleaning system for a combustion system 1, which in the case illustrated is designed as a diesel engine. The exhaust gas 2 from the combustion system 1 leaves the diesel engine through an exhaust manifold 3 and passes into the environment via an exhaust pipe 5. The diesel engine has an engine management system 6, which via an interface 30 provides operationally relevant parameters of the diesel engine, such as control-rod displacement, rotational speed, torque or injection time.

In the exhaust pipe 5, there is an oxidation catalytic converter 7 and a reduction catalytic converter 8 downstream of the oxidation catalytic converter. Both catalytic converters 7 and 8 are designed as honeycomb bodies through which medium can flow and which have a number of parallel flow passages. On its surface which is accessible to the exhaust gas 2, the oxidation catalytic converter 7 has 50–90 g/cf of platinum. The catalyst support itself comprises a thermally and mechanically stable ceramic, e.g. cordierite, or metal. The reduction catalytic converter 8 is produced as an unsupported extrudate comprising a ceramic material made up of 70 to 95% by weight of titanium dioxide, 5 to 20% by weight of tungsten trioxide and/or molybdenum trioxide and less than 5% by weight of vanadium pentoxide. Of course, both catalytic converters 7 and 8 may also be produced as plate-type catalytic converters with a suitable catalytic coating.

After it has left the combustion system 1, the exhaust gas 2 first of all flows through the oxidation catalytic converter 7, then through the reduction catalytic converter 8 and finally is released to the environment via the exhaust 9. At the oxidation catalytic converter 7, primarily nitrogen monoxide NO is converted into nitrogen dioxide $NO_2$. At the reduction catalytic converter 8, the nitrogen oxides, with the proportion of nitrogen dioxide $NO_2$ now increased, are reacted in the presence of a reagent to form molecular nitrogen $N_2$ and water $H_2O$.

To introduce the reagent into the exhaust gas 2, there is an introduction device 10. The introduction device 10 includes a reagent reservoir 12 and a first addition line 14 and a second addition line 15, which are both connected directly to the reagent reservoir 12. Both addition lines 14 and 15 open out into in each case one injection nozzle 17. In this case, the first addition line 14 opens out upstream of the oxidation catalytic converter 7, and the second addition line 15 opens out upstream of the reduction catalytic converter 8 and downstream of the oxidation catalytic converter 7. An aqueous urea solution 18 of known concentration is situated in the reagent reservoir 12 as the reagent itself.

The reagent vessel 12 is pressurized by means of a compressor 19, so that when the first control valve 20 is opened, the aqueous urea solution 18 is introduced into the exhaust gas 2 upstream of the oxidation catalytic converter 7 via the first addition line 14, and when the second control valve 22 is opened, the aqueous urea solution 18 is introduced into the exhaust gas 2 upstream of the reduction catalytic converter 8 and downstream of the oxidation catalytic converter 7 via the second addition line 15.

In addition, a temperature sensor 24 is arranged in the exhaust pipe 5, upstream of the oxidation catalytic converter 7.

The aqueous urea solution 18 is metered by a metering control unit 26, which is connected via the interfaces 30, 31, 32 and 33 to the outputs of the engine management system 6, the temperature sensor 24, the first control valve 20 and the second control valve 22. Via the interface 30, the metering control unit 26 receives the abovementioned operationally relevant parameters from the combustion system 1. A characteristic diagram implemented in the metering control unit 26 uses these operationally relevant parameters to calculate a quantity of reagent which is to be introduced according to the expected emission of nitrogen oxides, and the opening time of the first or second control valve 20 or 22 is controlled in accordance with this quantity.

Furthermore, the current exhaust-gas temperature is determined in the metering control unit 26 by use of the exhaust sensor 24 and is compared with an implemented set temperature. In the present case, the implemented set temperature is set to 200° C. If the exhaust-gas temperature is below the set temperature, the control valve 22 remains closed. The quantity of the aqueous urea solution 18 which is to be introduced per unit time is introduced into the exhaust gas 2 only upstream of the oxidation catalytic converter 7, by controlling the first control valve 20. If the exhaust-gas temperature is above the set temperature, the first control valve 20 remains closed and the quantity of the aqueous urea solution 18 which is to be introduced per unit time is introduced into the exhaust gas 2 downstream of the oxidation catalytic converter 7 and upstream of the reduction catalytic converter 8 via the second control valve 22. When the exhaust-gas temperature changes from above the set temperature to below the set temperature or vice versa, a gradual, gentle decrease in the quantity of reagent introduced may take place in the second addition line, and a gradual, gentle increase in the quantity of reagent which is introduced may take place in the first addition line 14, or vice versa. In other words, there is a temperature range within which the reagent is flowing through both the first addition line 14 and the second addition line 15. The location at which the reagent is introduced is shifted gradually.

Figure 2:
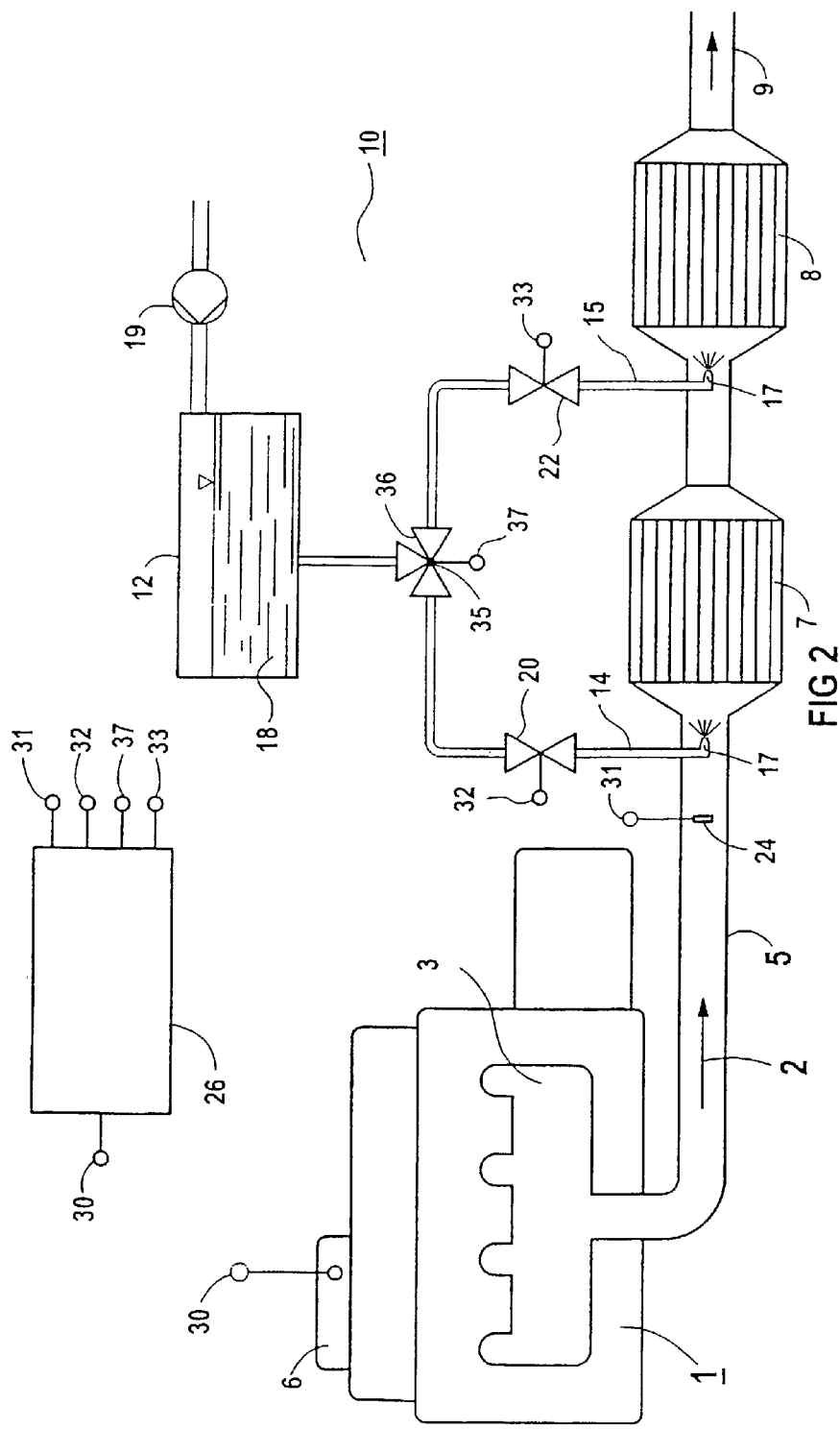

FIG. 2 illustrates an exhaust-cleaning system which is similar to the exhaust-cleaning system shown in FIG. 1. By contrast, however, in the exhaust-cleaning system illustrated in FIG. 2, a single feedline 24, which has a branching point 35 into the first addition line 14 and into the second addition line 15, is connected to the reagent reservoir 12. The branching point 35 itself is designed as a three-way valve 36 which allows the aqueous urea solution 18 to flow either into the first addition line 14 or into the second addition line 15. The three-way valve 35 is controlled via an interface 37 by means of the metering control unit 26. When the exhaust-gas temperature is below the set temperature, the aqueous urea solution 18 flows via the first addition line 14, while when the exhaust-gas temperature is above the set temperature the aqueous urea solution 18 flows via the second addition line 15.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the catalytic reduction of nitrogen oxides in the exhaust gas from a combustion system in which the exhaust gas first flows over an oxidation catalytic converter and then flows over a reduction catalytic converter, comprising:

measuring an exhaust-gas temperature;

comparing the measured temperature with a set temperature; and adding a reagent to the exhaust gas substantially before it flows through the oxidation catalytic converter when the measured exhaust-gas temperature is lower than the set temperature, and adding the reagent to the exhaust gas substantially after it has flowed through the oxidation catalytic converter and before it flows through the reduction catalytic converter when the measured exhaust-gas temperature is higher than the set temperature, wherein the reagent is introduced into the exhaust gas by an introduction device including a first addition line and a second addition line, the first addition line opening into the exhaust pipe upstream of the oxidation catalytic converter and the second addition line opening into the exhaust pipe downstream of the oxidation catalytic converter and upstream of the reduction catalytic converter.

2. The process as claimed in claim 1, wherein the set temperature is selected from a temperature range between 150° C. and 250° C.

3. The process as claimed in claim 2, wherein the set temperature is selected from a temperature range between 190° C. and 210° C.

4. The process as claimed in claim 1, wherein the exhaust-gas temperature is measured in the exhaust gas before it flows through the oxidation catalytic converter.

5. The process as claimed in claim 1, wherein the reagent includes at least one of an aqueous urea solution and aqueous ammonia.

6. The process as claimed in claim 2, wherein the exhaust-gas temperature is measured in the exhaust gas before it flows through the oxidation catalytic converter.

7. The process as claimed in claim 3, wherein the exhaust-gas temperature is measured in the exhaust gas before it flows through the oxidation catalytic converter.

8. The process as claimed in claim 5, wherein the reagent is injected into the exhaust gas via an injection nozzle.

9. The process as claimed in claim 2, wherein the reagent includes at least one of an aqueous urea solution and aqueous ammonia, and wherein the reagent is injected into the exhaust gas via an injection nozzle.

10. The process as claimed in claim 3, wherein the reagent includes at least one of an aqueous urea solution and aqueous ammonia, and wherein the reagent is injected into the exhaust gas via an injection nozzle.

11. The process as claimed in claim 4, wherein the reagent includes at least one of an aqueous urea solution and aqueous ammonia, and wherein the reagent is injected into the exhaust gas via an injection nozzle.

12. The process as claimed in claim 1, wherein when the exhaust gas first flows over the oxidation catalytic converter, the exhaust gas comprises at least one of Pt, Pd and Rh.

13. The process as claimed in claim 12, wherein when the exhaust gas then flows over the reduction catalytic converter, which on its surface is accessible to the exhaust gas, the exhaust gas comprises at least one of $TiO_2$, $WO_3$, $V_2O_5$ and $MoO_3$.

14. The process of claim 1, wherein the combustion system is a combustion system for a diesel motor.

15. A diesel motor, comprising a combustion system which performs the process of claim 1.

16. A process for the catalytic reduction of nitrogen oxides in the exhaust gas from a combustion system in which the exhaust gas first flows over an oxidation catalytic converter and then flows over a reduction catalytic converter, comprising:

measuring an exhaust-gas temperature;

comparing the measured temperature with a set temperature; and adding a reagent to the exhaust gas substantially before the exhaust gas flows through the oxidation catalytic converter when the measured exhaust-gas temperature is lower than the set temperature, or substantially after the exhaust gas has flowed through the oxidation catalytic converter and before the exhaust gas flows through the reduction catalytic converter when the measured exhaust-gas temperature is higher than the set temperatures wherein the reagent is introduced into the exhaust gas by an introduction device including a first addition line and a second addition line, the first addition line opening into the exhaust pipe upstream of the oxidation catalytic converter and the second addition line opening into the exhaust pipe downstream of the oxidation catalytic converter and upstream of the reduction catalytic converter.

* * * * *

UNITED STATES PATENT AND TRADEMARK OFFICE
CERTIFICATE OF CORRECTION

| | |
|---|---|
| PATENT NO. | : 7,241,431 B2 |
| APPLICATION NO. | : 10/204898 |
| DATED | : September 2, 2008 |
| INVENTOR(S) | : Vincenter J. Zimmer and Michael A. Rothman |

Page 1 of 1

It is certified that error appears in the above-identified patent and that said Letters Patent is hereby corrected as shown below:

Title Page, Item (54) Title & Col. 1, Line 1
"PROVIDING ACCESS TO SYSTEM MANAGEMENT INFORMATION" should be
--SYSTEM AND METHOD FOR CONVERTING SYSTEM MANAGEMENT DATA TO BE VIEWED AND UPDATED BEFORE OR DURING RUNTIME OF AN OPERATING SYSTEM--;

Column 7:
Line 21, "convened" should be --converted--;
Line 26, "convened" should be --converted--.

Signed and Sealed this

Third Day of February, 2009

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,241,431 B2 | Page 1 of 1 |
| APPLICATION NO. | : 10/204898 | |
| DATED | : July 10, 2007 | |
| INVENTOR(S) | : Stefan Fischer | |

It is certified that error appears in the above-identified patent and that said Letters Patent is hereby corrected as shown below:

This certificate supersedes the Certificate of Correction issued February 3, 2009. The certificate should be vacated since no Certificate of Correction was granted for this patent number.

Signed and Sealed this

Twenty-fourth Day of February, 2009

JOHN DOLL
*Acting Director of the United States Patent and Trademark Office*